(12) United States Patent  
Bredl

(10) Patent No.: US 7,862,116 B2
(45) Date of Patent: Jan. 4, 2011

(54) CUSHION FOR AIRCRAFT EJECTION SEAT

(75) Inventor: Steve Bredl, Colorado Springs, CO (US)

(73) Assignee: AMI Industries, Inc., Colorado Springs, CO (US)

(*) Notice: Subject to any disclaimer, the term of this patent is extended or adjusted under 35 U.S.C. 154(b) by 144 days.

(21) Appl. No.: 12/399,661

(22) Filed: Mar. 6, 2009

(65) Prior Publication Data
US 2010/0148552 A1 Jun. 17, 2010

Related U.S. Application Data

(60) Provisional application No. 61/122,977, filed on Dec. 16, 2008.

(51) Int. Cl.
B60N 2/58 (2006.01)
(52) U.S. Cl. .............. 297/228.12; 297/228.13; 297/440.22
(58) Field of Classification Search .............. 297/219.1, 297/228.12, 228.13, 440.22
See application file for complete search history.

(56) References Cited

U.S. PATENT DOCUMENTS

| | | | | | |
|---|---|---|---|---|---|
| 3,220,767 | A | * | 11/1965 | Hendrickson | 297/228.12 |
| 3,848,922 | A | * | 11/1974 | Blanford | 297/219.1 |
| 4,332,419 | A | * | 6/1982 | Vogel | 297/440.22 |
| 4,597,386 | A | * | 7/1986 | Goldstein | 602/19 |
| 5,301,903 | A | | 4/1994 | Aronne | |
| 6,241,188 | B1 | * | 6/2001 | Simpson et al. | 244/122 R |
| 6,338,527 | B1 | * | 1/2002 | Toyota et al. | 297/229 |
| 6,588,840 | B1 | * | 7/2003 | Lombardo | 297/228.12 |
| 6,929,325 | B1 | * | 8/2005 | Goelo | 297/219.1 |
| 7,234,770 | B1 | * | 6/2007 | Schiebl | 297/219.1 |
| 7,419,221 | B2 | * | 9/2008 | Fisher et al. | 297/440.2 |
| 2008/0315643 | A1 | | 12/2008 | Beroth et al. | |

FOREIGN PATENT DOCUMENTS

GB 928220 A 6/1963

* cited by examiner

Primary Examiner—Peter R. Brown
(74) Attorney, Agent, or Firm—Jerry J. Holden; John D. Titus

(57) ABSTRACT

A seat cushion for an aircraft seat includes a plurality of rear edge securing straps attached to the lower surface of the seat cushion. The rear edge securing straps each have a free end that includes a pull-the-dot fastener that engages a corresponding pull-the-dot fastener at the rear edge of the seat pan. The length of the rear edge securing straps is selected so that when the seat cushion is installed, the rear edge securing straps are pulled substantially flat so that the seat cushion is firmly held in place. The seat cushion is easily removable because the pull-the-dot fasteners are at the ends of the rear edge securing straps rather than affixed directly to the bottom of the seat cushion. Therefore, when the front edge of the seat cushion is released, the seat cushion can be lifted up enough to allow the cushion to be released without pulling at the bottom of the seat cushion.

17 Claims, 3 Drawing Sheets

-PRIOR ART-

CUSHION FOR AIRCRAFT EJECTION SEAT

CROSS-REFERENCE TO RELATED APPLICATIONS

The application claims priority of provisional application No. 61/122,977 filed Dec. 16, 2008.

BACKGROUND OF THE INVENTION

This invention relates to aircraft seating and more particularly to aircraft ejection seats.

It is well known in the art to provide a seat cushion for ejection seats mounted in military fighter and other aircraft to provide for some level of pilot comfort and to reduce pilot fatigue. It is advantageous to allow the seat cushion to be removed from the seat frame for maintenance/replacement without the necessity of removing the ejection seat from the aircraft. At the same time, the seat cushion must remain attached to the seat frame during high-speed maneuvers.

According to the prior art, a seat cushion is attached to the seat frame using a pair of pull-the-dot fasteners attached to the rear of the seat pan which mate with a corresponding pair of pull-the-dot fasteners attached to the lower side of the cushion. A pair of straps attached to the seat pan extend forward and are threaded through the bights in a pair of fabric straps attached along the lower front edge of the cushion. The ends of the straps are then secured to a pair of pull-the-dot fasteners located along the front edge of the seat pan.

Although the prior art ejection seat cushion adequately withstands the rigors of military service, cushions are often damaged during maintenance because of the stiffness of the seat cushion and the close proximity of the rear pull-the-dot fasteners to the seat back. It is difficult for a maintenance crewmember to work his/her fingers between the seat cushion and seat back to release the pull-the-dot fasteners. The stiffness of the seat cushion also prevents the maintenance crewmember from releasing the pull-the-dot fastener from underneath. Consequently, the seat cushion is often pulled on directly, with the result that the pull-the-dot fasteners tear from the seat cushion rather than releasing from the seat pan. Accordingly, what is needed a seat cushion that will withstand the rigors of military service and yet be simple to remove and install without damage.

SUMMARY OF THE INVENTION

The present invention comprises a seat cushion for an aircraft seat, in particular an aircraft ejection seat. Accordingly to an embodiment of the invention, the seat cushion includes a plurality of rear edge securing straps attached to the lower surface of the seat cushion. The rear edge securing straps each have a free end that includes a pull-the-dot fastener that engages a corresponding pull-the-dot fastener at the rear edge of the seat pan. The length of the rear edge securing straps is selected so that when the seat cushion is installed, the rear edge securing straps are substantially taut so that the seat cushion is firmly held in place. The seat cushion is easily removable because the pull-the-dot fasteners are at the ends of the rear edge securing straps rather than affixed directly to the bottom of the seat cushion. Therefore, when the front edge of the seat cushion is released, the seat cushion can be lifted up enough to allow the maintenance crewmember's hand to slide underneath the cushion to release the pull-the-dot fastener without pulling at the bottom of the seat cushion. Hook and loop fasteners may be disposed between the upper surface of the rear edge securing straps and the bottom surface of the cushion for additional resistance to shifting when installed.

BRIEF DESCRIPTION OF THE DRAWINGS

The present invention will be better understood from a reading of the following detailed description, taken in conjunction with the accompanying drawing figures in which like references designate like elements and, in which.

DETAILED DESCRIPTION

Figure 1:
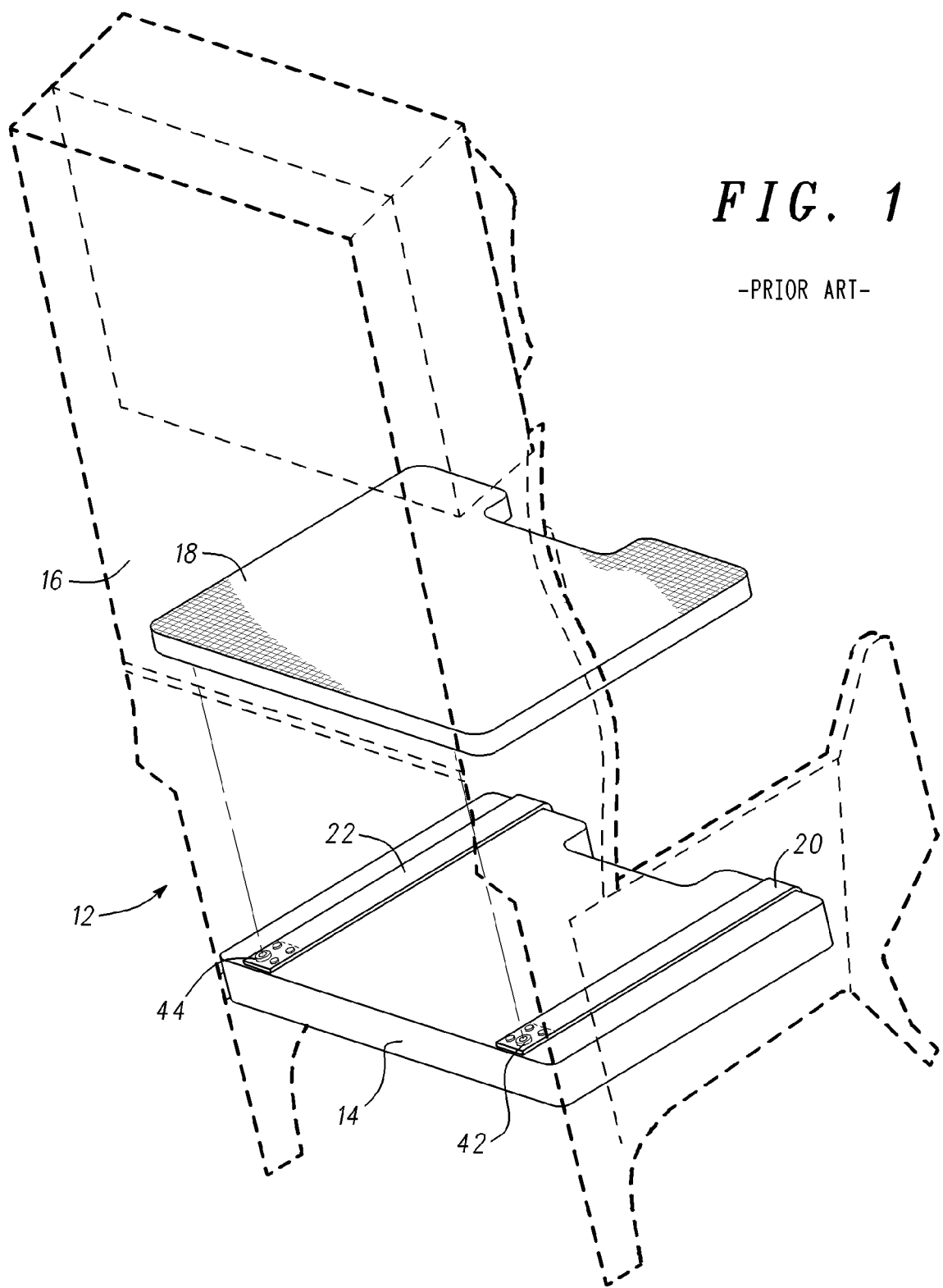
FIG. 1 is a rear perspective view of a prior art ejection seat and cushion.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

Figure 2:
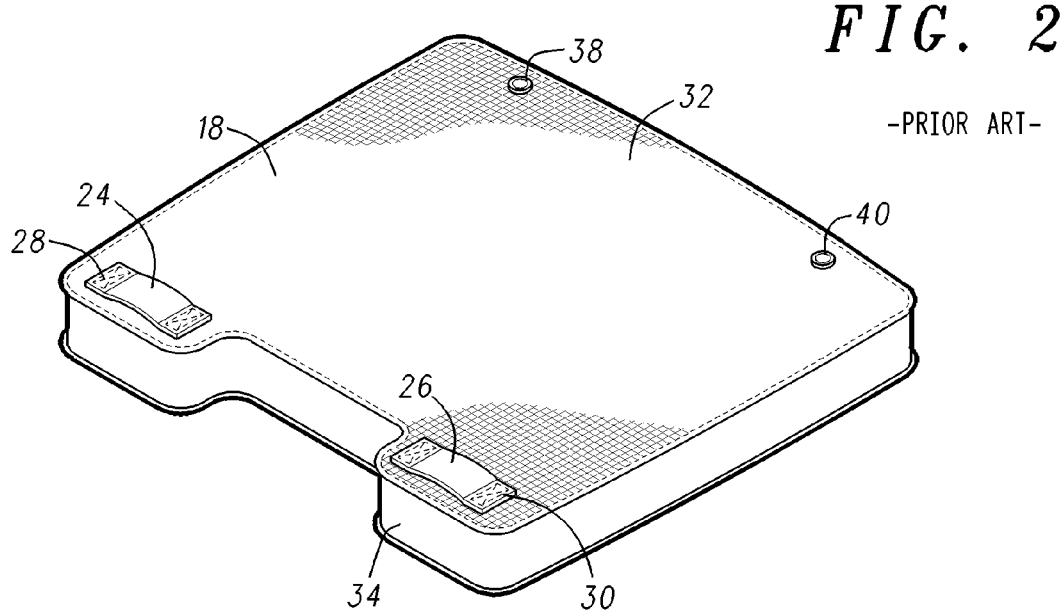
FIG. 2 is a perspective view of the underside of a prior art cushion.

With reference to FIGS. 1 and 2, a prior art ejection seat 12 comprises a rigid seat pan 14 and a rigid seatback 16. Ejection seat 12 may be any aircraft ejection seat but in the illustration of FIG. 1 comprises an ACES II® ejection seat found in United States Airforce F-15, F-16 and other combat aircraft. Ejection seat 12 is equipped with a seat cushion 18 which is attached to seat pan 14 by means of a pair of front edge securing straps 20, 22 which are threaded through bight portions 24 and 26 of cushion straps 28, 30 attached to lower surface 32 of cushion 18. Front edge securing straps 20, 22 are then attached to the front edge of seat pan 14 to secure the front edge 34 of cushion 18 to seat pan 14. The rear edge 36 of cushion 18 is secured to seat pan 14 by means of a pair of pull-the-dot fasteners 38, 40 which mate with a corresponding pair of pull-the-dot fasteners 42, 44 which are riveted to seat pan 14. As noted hereinbefore, because there is a tight fit between the rear edge 36 of cushion 18 and seatback 16, it is difficult if not impossible for a maintenance crewmember to reach pull-the-dot fasteners 38 and 40. Consequently, cushion 18 is frequently damaged by maintenance crewmembers pulling directly on cushion 18 in an attempt to release pull-the-dot fasteners 38 and 40.

With reference to FIGS. 3-6, a cushion 10 incorporating features of the present invention comprises a cushion body 50 having a forward edge 52, a rear edge 54, a top surface 56 and a bottom surface 58. Cushion body 50 may be of any conventional construction, but typically comprises a foam or pneumatic pad with a rigid plastic or hardboard base covered with a leather or synthetic covering 60. The type and construction of the cushion itself is provided herein for illustrative purposes only and should not be considered as limiting the present invention in any way. The bottom surface 58 of cushion body 50 includes straps 62, 64. Straps 62, 64 are stitched to covering 60 to form bights 66, 68 adapted to receive a front edge securing strap 20, 22. Cushion body 50 further includes rear edge securing straps 70, 72 having fixed ends 74, 76 stitched to covering 60 proximal the midpoint between rear edge 54 and forward edge 52 of cushion body 50. Although in the illustrative embodiment, rear edge securing straps 70, 72 are attached to covering 60 at approximately the midpoint of cushion body 50, for reasons discussed more fully hereinafter, the fixed ends 74, 76 of rear edge securing straps 70, 72 may be in any location provided rear edge securing straps 70, 72 are pulled substantially flat (i.e. taut) when cushion body 50 is installed. Rear edge securing straps 70, 72 include free ends 78, 80 each having a pull-the-dot fastener 82, 84 attached thereto. Pull-the-dot fasteners 82, 84 may be any conventional fastener capable of attaching to pull-the-dot fasteners 42, 44 of ejection seat 12, but preferably comprise the female halves of a MIL-F-10884 pull-the-dot fastener.

For reasons described more fully hereinafter, cushion body 50 further comprises regions 86, 88 comprising hook and loop fasteners disposed between the bottom surface 58 of cushion body 50 and the upper surfaces 90, 92 of rear edge securing straps 70, 72.

Figure 5:
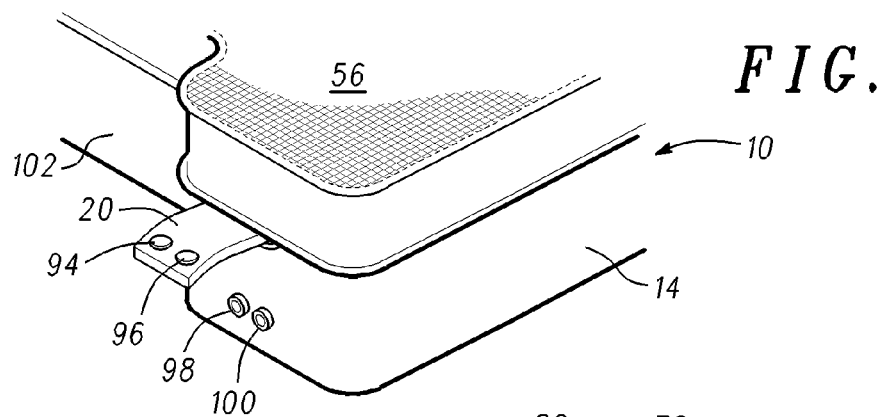
FIG. 5 is a perspective view of the forward edge of the seat cushion and seat of FIG. 4.
Figure 3:
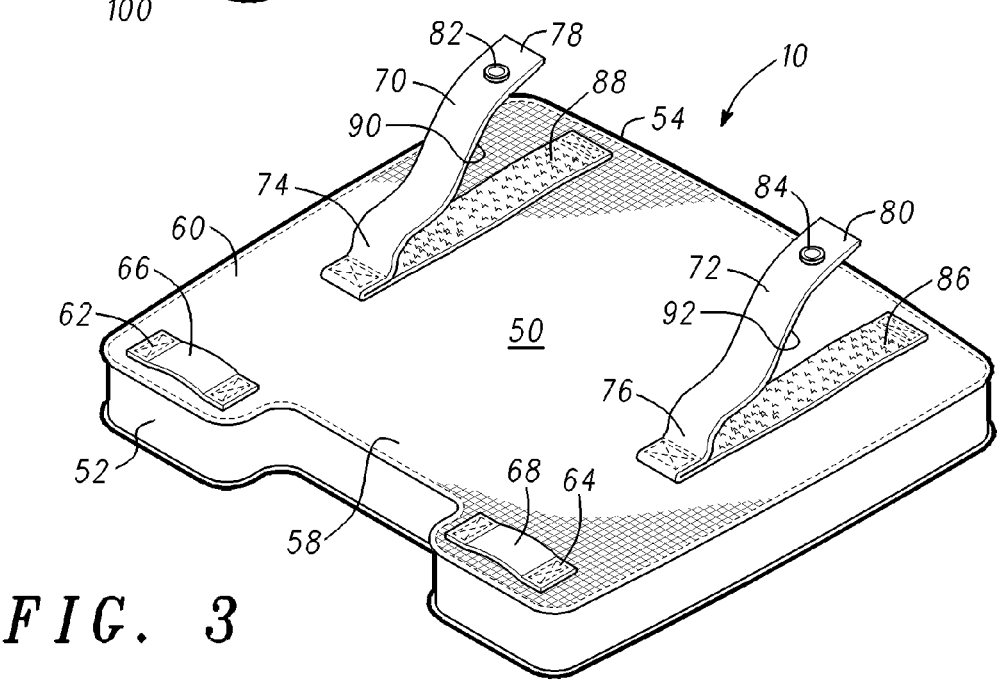
FIG. 3 is a perspective view of the underside of a seat cushion incorporating features of the present invention.
Figure 4:
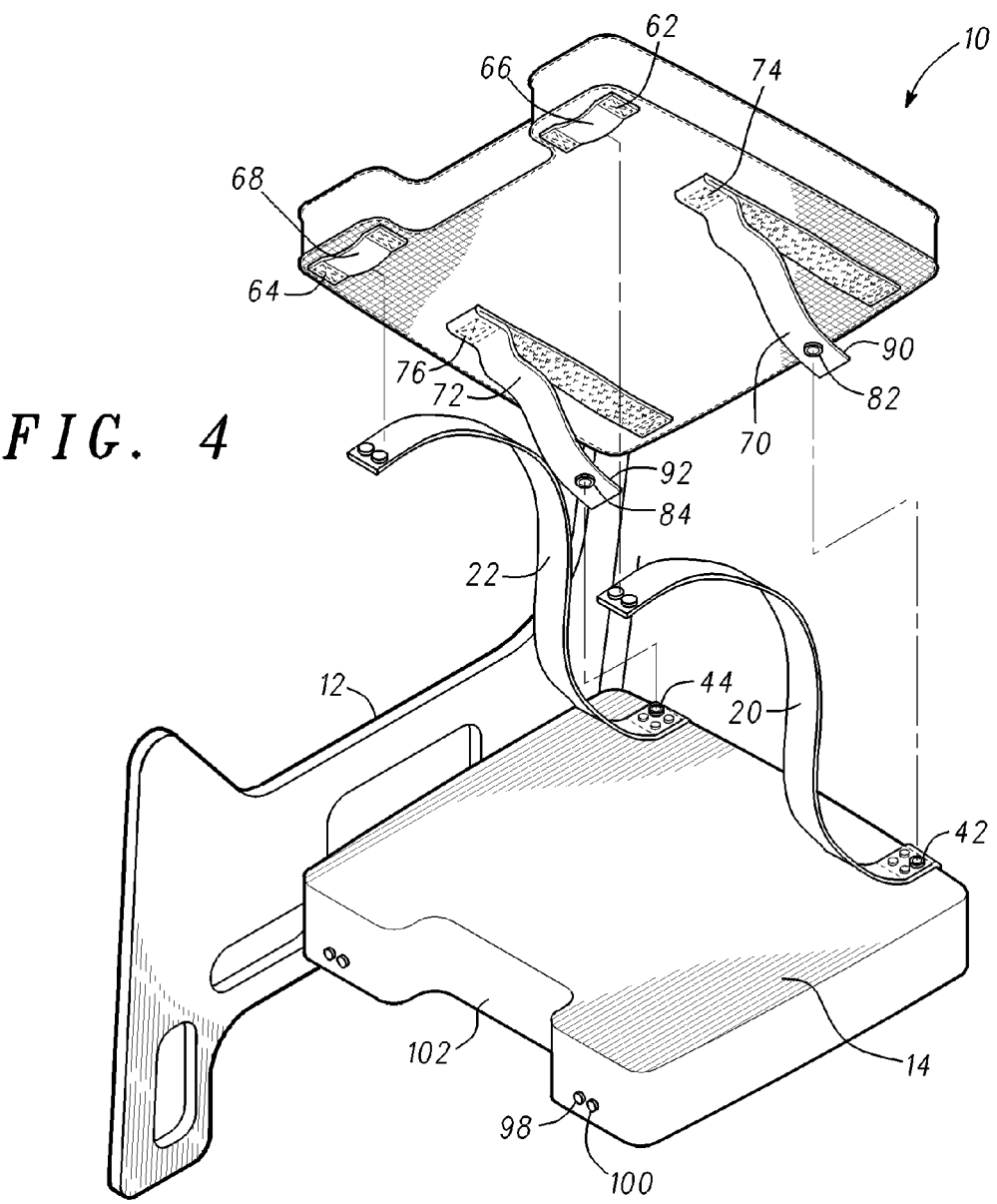
FIG. 4 is an exploded perspective view of a seat and the seat cushion of FIG. 3.
Figure 6:
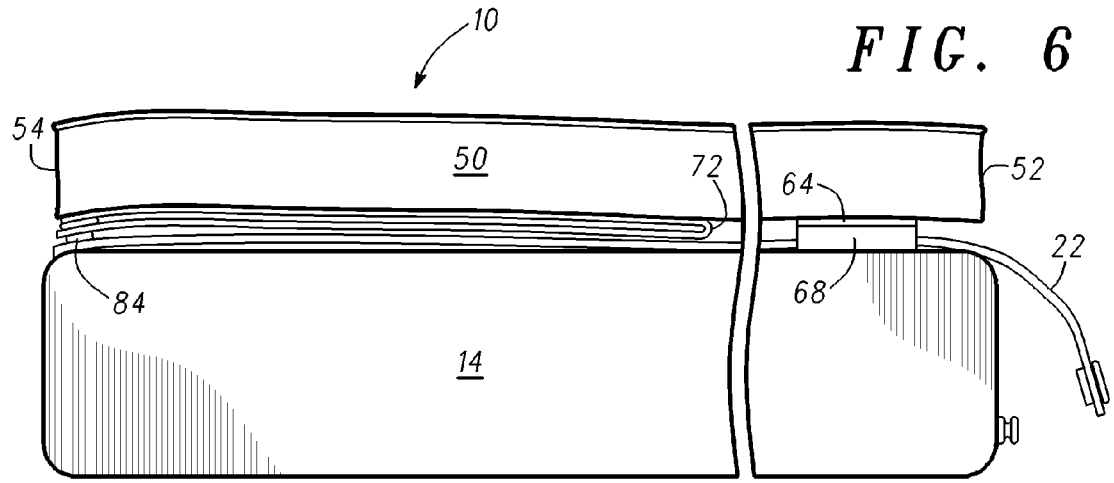
FIG. 6 is a partial side view of a seat cushion and seat of FIG. 4.

With particular reference to FIGS. 4-6, cushion 10 is secured to seat pan 14 as follows. Front edge securing straps 20, 22 are threaded through bight portions 66, 68 of straps 62, 64 while pull-the-dot fasteners 82, 84 at the free ends 78, 80 of rear edge securing straps 70, 72 are attached to corresponding pull-the-dot fasteners 42, 44 of seat pan 14. Because pull-the-dot fasteners 82, 84 are at the free ends 78, 80 of rear edge securing straps 70, 72 the fasteners are accessible. Once pull-the-dot fasteners 82, 84 are attached, front edge securing straps 20, 22 are pulled tight and (as shown in FIG. 5) fasteners 94, 96 are attached to rigid fasteners 98, 100 at the forward edge 102 of seat pan 14. This action pulls and secures front edge securing strap 20 tight against seat pan 14. The attachment of front edge securing strap 22 is similar to the attachment of front edge securing strap 20 and therefore is not discussed in detail. The length of rear edge securing straps 70, 72 is selected such that when front edge securing straps 20, 22 are secured, rear edge securing straps 70, 72 are pulled substantially taut from their fixed ends 74, 76 to their free ends 78, 80 (which are attached to pull-the-dot fasteners 42, 44). Additionally, the tight clearance between rear edge 54 and seatback 16 urges cushion body 50 forward thereby pulling rear edge securing straps 70, 72 taut.

Hook and loop fastener regions 86, 88 cooperate with rear edge securing straps 70, 72 to hold cushion body 50 firmly in place. It is well known that hook and loop fasteners are substantially stronger in shear than in tension or t-peel. Accordingly, hook and loop fasteners by themselves would likely be insufficient to hold cushion body 50 in place when subjected to a military aircraft environment. However, in combination with rear edge securing straps 70, 72 which are held in tension by the rear edge 54 of cushion body 50 pressing against seatback 16, the hook and loop fasteners and pull-the-dot fasteners are sufficiently robust to secure cushion body 50 to ejection seat 12 sufficiently to withstand the rigors of military use.

Although certain illustrative embodiments and methods have been disclosed herein, it will be apparent from the foregoing disclosure to those skilled in the art that variations and modifications of such embodiments and methods may be made without departing from the invention. For example, although in the illustrative embodiment, the rear edge and other straps are stitched to covering 60 of cushion body 50, any suitable means of attachment such as adhesive, plastic fusion welding, or other method of attachment is considered within the scope of the present invention. Moreover, although the rear edge securing straps 70, 72 are shown as extending parallel to front edge securing straps 20, 22, rear edge securing straps 70, 72 could extend in any direction provided they are stretched essentially flat when cushion body 50 is installed. Additionally, although regions 86, 88 in the illustrative embodiment comprise hook and loop fasteners, any fastener with a comparatively low release force (as compared with a MIL-F10884 fastener) such as film adhesives, tape, or civilian snap fasteners could be substituted for the hook and loop fasteners without departing from the scope of the invention. Accordingly, it is intended that the invention should be limited only to the extent required by the appended claims and the rules and principles of applicable law. Additionally, as used herein, unless otherwise specifically defined, the terms "substantially" or "generally" when used with mathematical concepts or measurements mean within ±10 degrees of angle or within 10 percent of the measurement, whichever is greater.

What is claimed is:

1. A seat cushion for use with an aircraft ejection seat comprising a frame having a seat back and a seat pan, wherein the seat pan is a rigid structure having a rearward edge proximal the seat back and a forward edge displaced in a forward direction from the seat back, said seat cushion comprising:

a plurality of front edge securing straps, each of said plurality of front edge securing straps having a fixed end and a free end, the fixed end of each of said plurality of front edge securing straps being secured to the seat pan proximal the rearward edge thereof, the free end of each of said plurality of front edge securing straps having a front strap fastener attached thereto;

a plurality of fixed front edge fasteners, each of said plurality of fixed front edge fasteners being attached to the frame of the ejection seat proximal the front edge of the seat pan, each of said plurality of fixed front edge fasteners being adapted to mate with one of said front strap fasteners, wherein the length of each of said plurality of front edge securing straps is such that each of said front edge securing straps is held substantially taut when a corresponding one of said front strap fasteners is engaged with a corresponding one of said fixed front edge fasteners;

a plurality of fixed rear edge fasteners attached to the seat pan proximal the seat back; and a seat cushion body having a padded upper portion and a lower surface, the lower surface of said seat cushion body including having a plurality of forward edge straps and a plurality of rear edge securing straps attached thereto, each of said plurality of forward edge straps comprising a strap attached to said seat cushion body proximal the forward edge having a bight portion through which one of said plurality of front edge securing straps passes when said seat cushion body is installed, and each of said plurality of rear edge securing straps comprising a strap having a fixed end and a free end, the fixed end of each of said plurality of rear edge securing straps being attached to the lower surface of said seat cushion body at a location displaced from said fixed rear edge fasteners when said seat cushion body is installed, the free end of each of said plurality of rear edge securing straps having a rear strap fastener attached thereto, each of said rear strap fasteners being adapted to mate with one of said fixed rear edge fasteners, wherein the length of each of said plurality of rear edge securing straps is such that each of said rear edge securing straps is held substantially taut when a corresponding one of said rear strap fasteners is engaged with a corresponding one of said fixed rear edge fasteners when said seat cushion body is installed.

2. The seat cushion of claim 1, wherein:
said fixed end of said plurality of rear edge securing straps are located forward of said fixed rear edge fasteners when said seat cushion is installed.

3. The seat cushion of claim 1, further comprising:
a plurality of hook and loop fasteners disposed between the lower surface of said seat cushion body and an upper surface of at least one of said plurality of rear edge securing straps.

4. The seat cushion of claim 3, wherein:
said plurality of hook and loop fasteners is disposed between the lower surface of said seat cushion body and an upper surface of each of said plurality of rear edge securing straps.

5. The seat cushion of claim 1, wherein:
said fixed rear edge fasteners and said rear strap fasteners each comprise mating halves of a pull-the-dot fastener.

6. The seat cushion of claim 5, wherein:
said fixed rear edge fasteners and said rear strap fasteners each comprise mating halves of a MIL-F-10884 pull-the-dot fastener.

7. The seat cushion of claim 1, wherein:
the fixed ends of said rear edge securing straps are stitched to the lower surface of said seat cushion body.

8. The seat cushion of claim 1, wherein:
said rear edge securing straps are parallel and adjacent to said front edge securing straps when said seat cushion body is installed.

9. In combination with an aircraft ejection seat, an improved seat cushion of the type wherein the front edge of the cushion is secured to the aircraft ejection seat pan by means of a plurality of front edge securing straps, which are secured to the rear edge of the seat pan and pass through loops at the front edge of the lower surface of the cushion and are then secured by snap fasteners to the front edge of the seat frame, wherein the rear portion of the seat pan includes rear snap fasteners for securing the rear edge of the seat cushion, the improvement comprising:
a plurality of rear edge securing straps, each of said plurality of rear edge securing straps having a fixed end and a free end, the fixed end of each of said plurality of rear edge securing straps being attached to the lower surface of said seat cushion at a location displaced from the rear snap fasteners when said seat cushion is secured to the seat frame, wherein the free end of each of said plurality of rear edge securing straps has a snap fastener attached thereto adapted to mate with the rear snap fasteners of the seat pan, wherein the length of each of said plurality of rear edge securing straps from the fixed end thereof to the snap fastener attached thereto is substantially equal to the distance from the fixed end of said plurality of rear edge securing straps to the rear snap fastener, whereby when said seat cushion is installed, each of said plurality of rear edge securing straps is extended substantially its full length.

10. The seat cushion of claim 9, wherein:
said fixed end of said plurality of rear edge securing straps are located forward of said fixed rear edge fasteners when said seat cushion is installed.

11. The seat cushion of claim 9, further comprising:
a plurality of hook and loop fasteners disposed between the lower surface of said seat cushion and an upper surface of at least one of said plurality of rear edge securing straps.

12. The seat cushion of claim 11, wherein:
said plurality of hook and loop fasteners is disposed between the lower surface of said seat cushion and an upper surface of each of said plurality of rear edge securing straps.

13. The seat cushion of claim 9, wherein:
said rear snap fasteners and said snap fasteners on said rear edge securing straps each comprise mating halves of a pull-the-dot fastener.

14. The seat cushion of claim 13, wherein:
said rear snap fasteners and said snap fasteners on said rear edge securing straps each comprise mating halves of a MIL-F-10884 pull-the-dot fastener.

15. The seat cushion of claim 9, wherein:
the fixed ends of said rear edge securing straps are stitched to the lower surface of said seat cushion.

16. The seat cushion of claim 9, wherein:
said rear edge securing straps are parallel and adjacent to said front edge securing straps when said seat cushion is installed.

17. The seat cushion of claim 9, wherein:
said rear edge securing straps are in tension when said seat cushion is installed.

* * * * *